(12) United States Patent
Shibata et al.

(10) Patent No.: US 11,249,297 B2
(45) Date of Patent: Feb. 15, 2022

(54) IMAGE ACQUISITION DEVICE AND IMAGE ACQUISITION METHOD

(71) Applicant: HAMAMATSU PHOTONICS K.K., Hamamatsu (JP)

(72) Inventors: Takeshi Shibata, Hamamatsu (JP); Yasumoto Suzuki, Hamamatsu (JP); Takayuki Kawashima, Hamamatsu (JP); Satoshi Watanabe, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 357 days.

(21) Appl. No.: 16/487,146

(22) PCT Filed: Mar. 12, 2018

(86) PCT No.: PCT/JP2018/009451
§ 371 (c)(1),
(2) Date: Aug. 20, 2019

(87) PCT Pub. No.: WO2018/190054
PCT Pub. Date: Oct. 18, 2018

(65) Prior Publication Data
US 2020/0057293 A1 Feb. 20, 2020

(30) Foreign Application Priority Data
Apr. 13, 2017 (JP) .............................. JP2017-079667

(51) Int. Cl.
*G02B 21/34* (2006.01)
*G02B 21/36* (2006.01)

(52) U.S. Cl.
CPC ........... *G02B 21/34* (2013.01); *G02B 21/365* (2013.01)

(58) Field of Classification Search
CPC .. G02B 21/0016; G02B 21/34; G02B 21/365; G02B 21/367; G02B 23/00;
(Continued)

(56) References Cited

U.S. PATENT DOCUMENTS

| 2005/0196320 | A1* | 9/2005 | Veiner | G01N 35/04 422/63 |
| 2006/0109432 | A1* | 5/2006 | Guiney | G03B 23/00 353/103 |

(Continued)

FOREIGN PATENT DOCUMENTS

| JP | H5-063060 A | 3/1993 |
| JP | H11-111814 A | 4/1999 |

(Continued)

OTHER PUBLICATIONS

"White Paper Optical Sensors", http://www.ipf-electronic.de/fileadmin/news_import/ipf_white_paper_optical_sensors_01.pdf, Aug. 17, 2015,XP 55749275.

(Continued)

*Primary Examiner* — Mustak Choudhury
(74) *Attorney, Agent, or Firm* — Faegre Drinker Biddle & Reath LLP

(57) ABSTRACT

An image acquisition device includes a cassette mounting unit in which a cassette is detachably mounted, the cassette holding the slide glasses in a plurality of stages in a predetermined arrangement direction, a light source that emits inspection light toward the cassette, a scanning unit that performs scanning with the inspection light in the arrangement direction, a light reflection unit that is disposed on the back surface side of the cassette and reflects the inspection light emitted from the light source, a light detection unit that detects reflected light including the inspection light reflected by at least one of the light reflection unit, the cassette, and the slide glass, and outputs a detection signal, (Continued)

and an information generation unit that generates holding information on a holding position and/or a holding state of the slide glass held in the cassette on the basis of the detection signal.

6 Claims, 17 Drawing Sheets

(58) Field of Classification Search
CPC . G01N 2035/0441; G01N 2035/00039; G01N 2035/00049; G01N 35/00732; G01N 35/00029; G01N 2035/0494; G01N 2035/00138; G01N 35/04; B01L 2300/0627; B01L 2300/021; B01L 2300/168; B01L 2300/0822; B01L 2300/0858; B01L 9/52
See application file for complete search history.

(56) References Cited

U.S. PATENT DOCUMENTS

| | | | | |
|---|---|---|---|---|
| 2006/0164611 | A1* | 7/2006 | Scampini | G02B 21/34 |
| | | | | 353/103 |
| 2006/0165961 | A1* | 7/2006 | Tsutsui | G09F 13/16 |
| | | | | 428/192 |
| 2008/0240613 | A1* | 10/2008 | Dietz | G02B 21/367 |
| | | | | 382/284 |
| 2011/0114854 | A1* | 5/2011 | Fischer | G01N 35/00029 |
| | | | | 250/459.1 |
| 2014/0007935 | A1* | 1/2014 | Mutitu | H01L 31/02327 |
| | | | | 136/256 |
| 2014/0178169 | A1* | 6/2014 | Hebert | B01L 9/52 |
| | | | | 414/752.1 |
| 2014/0238474 | A1* | 8/2014 | Wernsman | H01L 31/04 |
| | | | | 136/253 |
| 2016/0324090 | A1* | 11/2016 | Miyabe | F21V 7/0008 |

FOREIGN PATENT DOCUMENTS

| | | |
|---|---|---|
| JP | 2003-92341 A | 3/2003 |
| JP | 2004-184226 A | 7/2004 |
| JP | 2004-337478 A | 12/2004 |
| JP | 2005-500522 A | 1/2005 |
| JP | 2007-163323 A | 6/2007 |
| JP | 2012-211844 A | 11/2012 |
| JP | 2013-127578 A | 6/2013 |
| JP | 2014-526712 A | 10/2014 |
| WO | WO 03/008103 A1 | 1/2003 |
| WO | WO-2006/098442 A1 | 9/2006 |
| WO | WO 2013/034430 A1 | 3/2013 |
| WO | WO 2016/016814 A1 | 2/2016 |
| WO | WO-2016016814 A1 * | 2/2016 ....... G01N 35/00029 |

OTHER PUBLICATIONS

International Preliminary Report on Patentability' (IPRP) dated Oct. 24, 2019 that issued in WO Patent Application No. PCT/JP2018/009451.

* cited by examiner

IMAGE ACQUISITION DEVICE AND IMAGE ACQUISITION METHOD

TECHNICAL FIELD

The present disclosure relates to an image acquisition device and an image acquisition method that are used for acquisition of an image of a sample or the like.

BACKGROUND ART

An example of this type of image acquisition device includes an image acquisition device described in Patent Literature 1. This image acquisition device includes a macro image acquisition device that acquires a macro image of a sample, and a micro image acquisition device that acquires a micro image of the sample. The macro image acquisition device acquires a macro image of a sample on a slide glass, and sets scanning conditions (a scan range, focus acquisition information, and the like) for acquiring a micro image on the basis of the acquired macro image. The micro image acquisition device includes an objective lens with a high magnification according to the scanning conditions set on the basis of the macro image. The micro image acquisition device acquires a high magnification (high resolution) image of the sample on the slide glass using the high magnification objective lens.

Further, an example of a device that conveys a plurality of slide glasses to the image acquisition device as described above includes a slide glass conveyance device of Patent Literature 2. The slide glass conveyance device includes a removal device that removes a slide glass from a cassette holding the slide glasses in a plurality of stages and conveys the slide glass to a predetermined position. The slide glass conveyance device includes a removal hand that includes a protrusion engaged with the slide glass, a driving mechanism that performs operations such as advancing, retracting, and raising of the removal hand, and a positioning guide that is provided at an advancing position of the slide glass.

CITATION LIST

Patent Literature

[Patent Literature 1] Japanese Unexamined Patent Publication No. 2013-127578
[Patent Literature 2] WO 2006/098442 Pamphlet

SUMMARY OF INVENTION

Technical Problem

The slide glass conveyance device as described above is useful in that the slide glass conveyance device conveys a large number of slide glasses to an image acquisition device so that the image acquisition device can continuously execute image acquisition of the sample. However, a holding position of the slide glass may vary from each cassette according to a type of sample or the like. Further, a case in which the slide glass is not correctly set to the cassette is conceivable. Therefore, it is necessary to ascertain a holding position and/or a holding state of the slide glass in the cassette in advance in order to reduce unnecessary conveyance work in the image acquisition device and shorten a time required for image acquisition in units of cassettes.

The present disclosure has been made to solve the above problems, and an object of the present disclosure is to provide an image acquisition device and an image acquisition method capable of ascertaining a holding position and/or a holding state of a slide glass in a cassette in advance.

Solution to Problem

An image acquisition device according to an aspect of the present disclosure is an image acquisition device for acquiring an image of samples held on slide glasses, the image acquisition device including: a cassette mounting unit in which a cassette is detachably mounted, the cassette holding the slide glasses in a plurality of stages in a predetermined arrangement direction; a light source that emits inspection light toward the cassette mounted in the cassette mounting unit; a scanning unit that performs scanning with the inspection light in the arrangement direction; a light reflection unit that is disposed on the back surface side of the cassette and reflects the inspection light emitted from the light source; a light detection unit that detects reflected light including the inspection light reflected by at least one of the light reflection unit, the cassette, and the slide glass, and outputs a detection signal; and an information generation unit that generates holding information on at least one of a holding position and a holding state of the slide glass held in the cassette on the basis of the detection signal.

Further, an image acquisition method according to an aspect of the present disclosure is an image acquisition method for acquiring an image of samples held on slide glasses, the image acquisition method including: a light emission step of emitting inspection light from a light source toward a cassette, the cassette holding the slide glasses in a plurality of stages in a predetermined arrangement direction; a reflection step of reflecting the inspection light emitted from the light source using a light reflection unit disposed on the back surface side of the cassette while scanning the cassette with the inspection light in the arrangement direction; a light detection step of detecting reflected light including the inspection light reflected by at least one of the light reflection unit, the cassette, and the slide glass using a light detection unit, and outputting a detection signal; and a generation step of generating holding information on at least one of a holding position and a holding state of the slide glass held in the cassette on the basis of the detection signal.

In the image acquisition device and the image acquisition method, the inspection light from the light source toward the cassette holding the slide glasses in a plurality of stages in the predetermined arrangement direction is scanned in the arrangement direction, and the inspection light is reflected by the light reflection unit. The light detection unit detects the reflected light including the inspection light reflected by at least one of the light reflection unit, the cassette, and the slide glass. At a position in which the slide glass is present, an intensity of the reflected light detected by the light detection unit becomes small since the inspection light is scattered by the slide glass and only a part of the inspection light is detected as the reflected light by the light detection unit. On the other hand, at a position in which the slide glass is not present, the intensity of the reflected light detected by the light detection unit becomes higher than in a position in which the slide glass is present since the inspection light is reflected by the light reflection unit without being scattered by the slide glass. Since the holding position and/or the holding state of the slide glass in the cassette appear as a detection signal from the light detection unit, holding information on the holding position and/or the holding state of the slide glass can be generated by analyzing the detection signal. By ascertaining the holding information in advance, it is possible to reduce useless conveyance work in the image acquisition device and to shorten a time required for image acquisition in units of cassettes.

Further, in the information generation unit or the generation step, reference information generated on the basis of a detection signal for the reflected light in a state in which a cassette having no slide glass held therein is mounted in the cassette mounting unit may be held, and the holding information may be generated on the basis of the detection signal corrected with the reference information. It is possible to enhance generation accuracy of the holding information by performing such correction on the detection signal.

Further, the cassette may include an opening through which the inspection light and the reflected light pass. In this case, the reflected light from the light reflection unit can be detected with a more sufficient amount of light. Therefore, it is possible to further enhance the generation accuracy of the holding information.

Further, in the light reflection unit or the light reflection step, the inspection light having passed through the opening may be reflected toward the light detection unit, and the light detection unit may detect the reflected light that has passed through the opening. In this case, since an optical system required for generation of the holding information can be simplified, an increase in size of the image acquisition device can be avoided. Further, the light reflection unit can be used commonly for different cassettes.

The light reflection unit may be disposed on a back surface of the cassette. In this case, since it is not necessary to provide the cassette with a mechanism for transmitting the inspection light, it is possible to avoid complication of a configuration of the cassette. Further, a distance between the light source and the light detection unit, and the light reflection unit can be shortened, and the reflected light can be detected with a sufficient amount of light. Therefore, it is possible to further enhance the generation accuracy of the holding information.

Further, the light reflection unit may include a retroreflector. In this case, the reflected light from the light reflection unit can be detected with a more sufficient amount of light. Therefore, it is possible to further enhance the generation accuracy of the holding information.

Advantageous Effects of Invention

According to the present disclosure, it is possible to ascertain a holding position and/or a holding state of a slide glass in a cassette in advance.

DESCRIPTION OF EMBODIMENTS

Hereinafter, preferred embodiments of an image acquisition device and an image acquisition method according to an aspect of the present disclosure will be described in detail with reference to the drawings.

Figure 1:
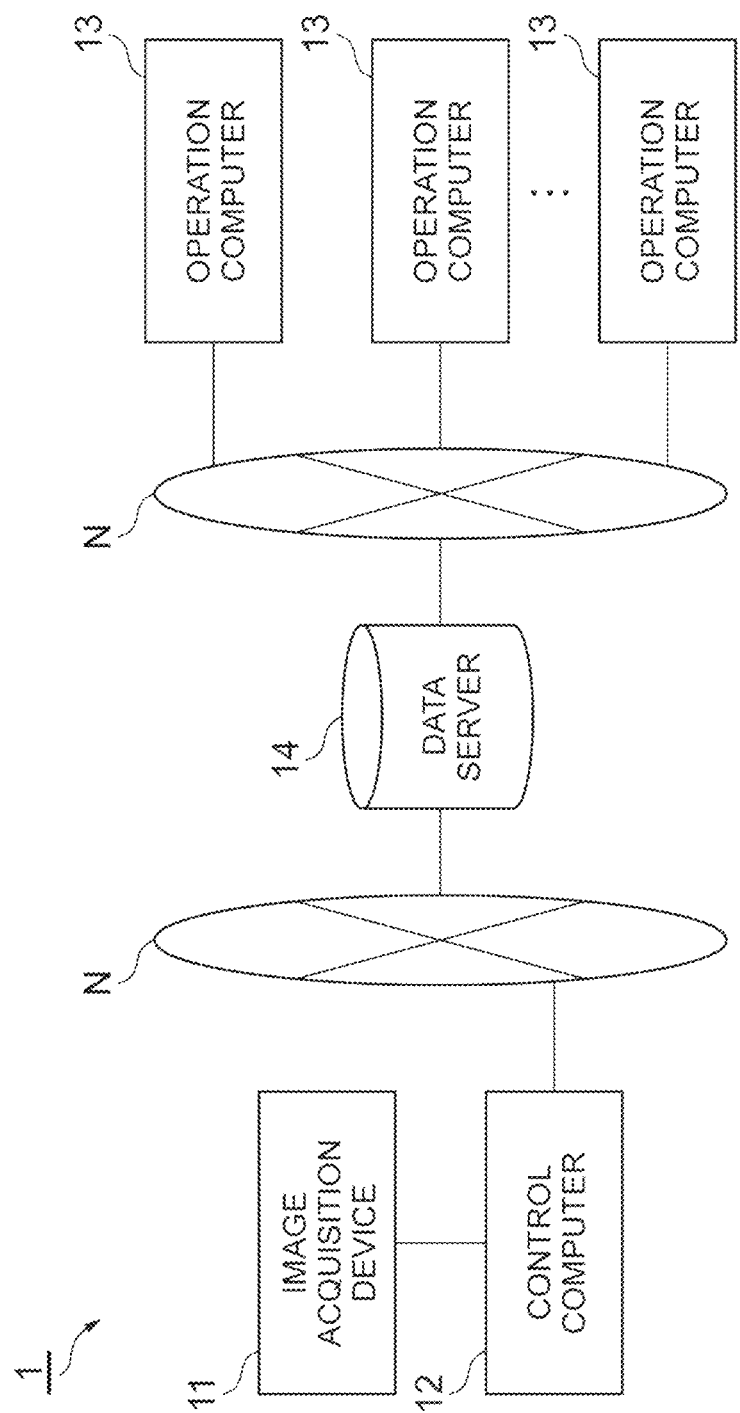
FIG. 1 is a system configuration diagram illustrating an example of an image acquisition system including an image acquisition device.

FIG. 1 is a system configuration diagram illustrating an example of an image acquisition system including an image acquisition device. As illustrated in FIG. 1, an image acquisition system 1 includes an image acquisition device 11, a control computer 12 that controls an operation of the image acquisition device 11, a plurality of operation computers 13 that is used for operation of the image acquisition device 11, and a data server 14 that stores various pieces of data that are used in the image acquisition system 1. The image acquisition system 1 is a system in which the image acquisition device 11 is remotely operated using operation computers 13 at different installation places, a virtual slide image of a sample such as a biological sample is acquired by the image acquisition device 11, and observation of the sample based on the virtual slide image can be performed at various facilities.

The control computer 12 and the operation computers 13 are physically a computer system that includes a memory such as a RAM and a ROM, and a processor (an arithmetic circuit) such as a CPU. The control computer 12 and the operation computer 13 are, for example, a personal computer, a smart device, a microcomputer, or a cloud server. Further, a display device such as a display, an input device such as a keyboard and a mouse, and the like are connected to the control computer 12 and the operation computer 13. Further, the display device and the input device may be a touch screen or a smart device.

The image acquisition device 11 and the control computer 12 are installed, for example, in the same room in a facility and are connected by a cable or wirelessly so that the image acquisition device 11 and the control computer 12 can communicate information with each other. The data server 14 is installed, for example, in a data center different from the facility in which the image acquisition device 11 and the control computer 12 are installed, and is connected to the control computer 12 via a network N so that the data server 14 can communicate information with the control computer 12. The operation computer 13 is installed, for example, in an arbitrary facility, and is connected to the data server 14 via the network N so that the operation computer 13 can communicate information with the data server 14. It should be noted that the image acquisition device 11 and the control computer 12 may be installed in separate facilities or separate rooms. Further, the data server 14 may be installed in the same facility as the control computer 12.

The control computer 12 and the operation computer 13 receive an input such as scanning conditions for a sample in the image acquisition device 11 from a user, and control an operation of the image acquisition device 11 on the basis of the input conditions. Further, the control computer 12 transmits various pieces of data such as image data acquired by the image acquisition device 11 to the data server 14. The control computer 12 and the operation computer 13 have a browsing function of displaying a virtual slide image acquired by the image acquisition device 11 on a display by referring to various pieces of data stored in the data server 14.

Figure 2:
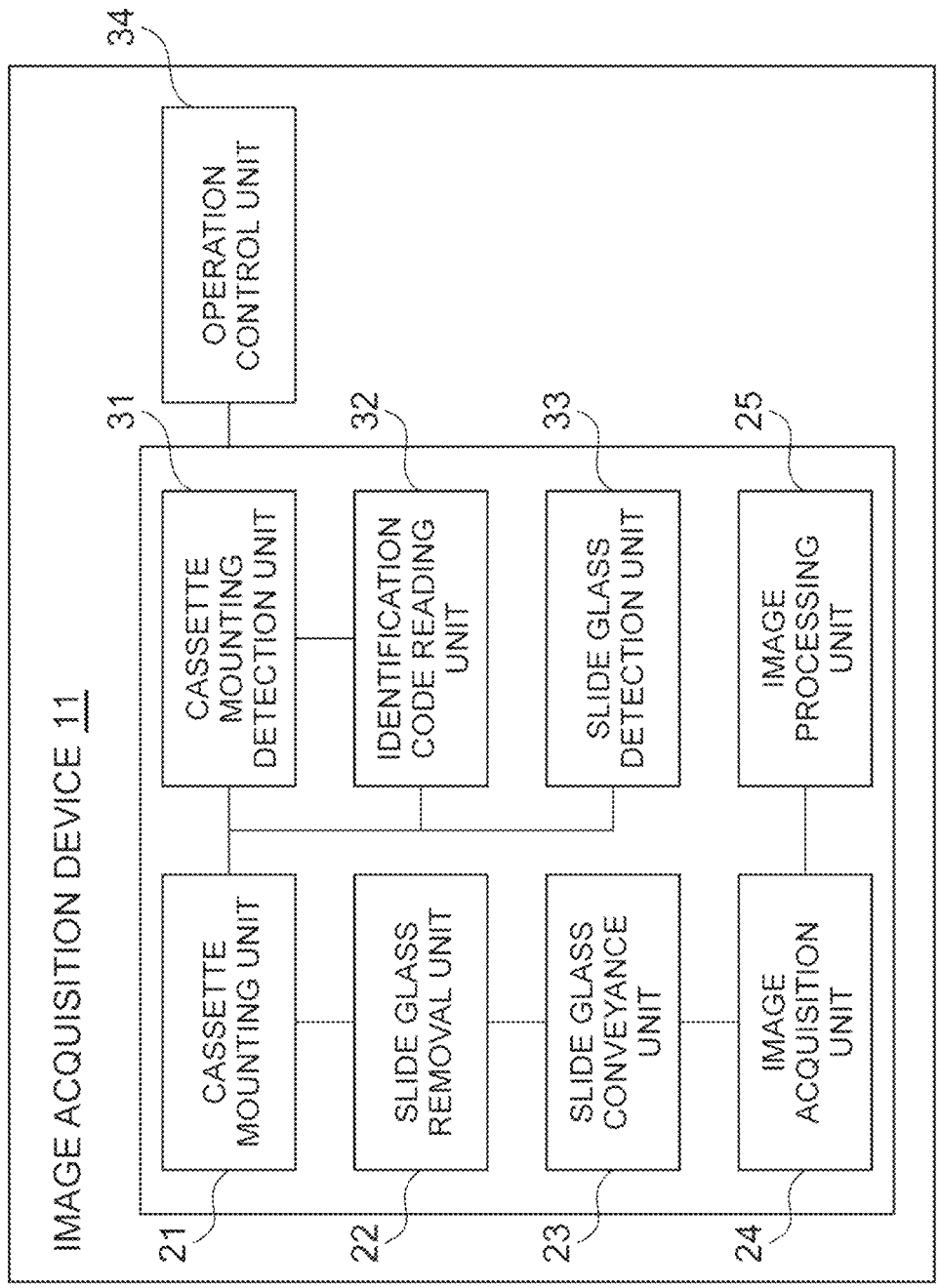
FIG. 2 is a block diagram illustrating an embodiment of the image acquisition device.

Next, the image acquisition device 11 will be described. FIG. 2 is a block diagram illustrating an embodiment of an image acquisition device. As illustrated in FIG. 2, the image acquisition device 11 includes a cassette mounting unit 21, a slide glass removal unit 22, a slide glass conveyance unit 23, an image acquisition unit 24, and an image processing unit 25. Further, for the cassette mounting unit 21, a cassette mounting detection unit 31, an identification code reading unit 32, and a slide glass detection unit 33 are provided. Further, the image acquisition device 11 further includes an operation control unit 34 that controls an operation of each of these components on the basis of control from the control computer 12 or the operation computer 13.

Figure 3:
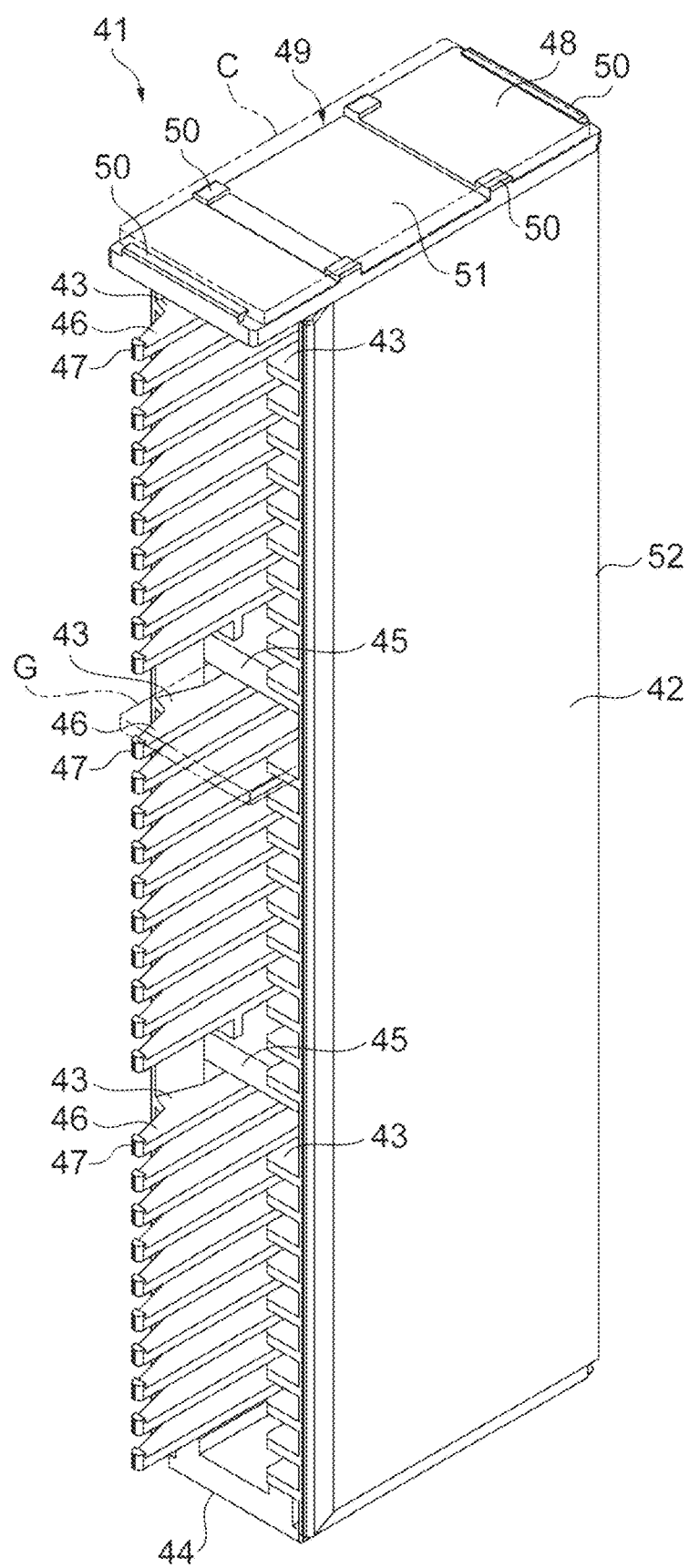
FIG. 3 is a perspective view illustrating an example of a cassette that holds a slide glass from the front surface side.
Figure 4:
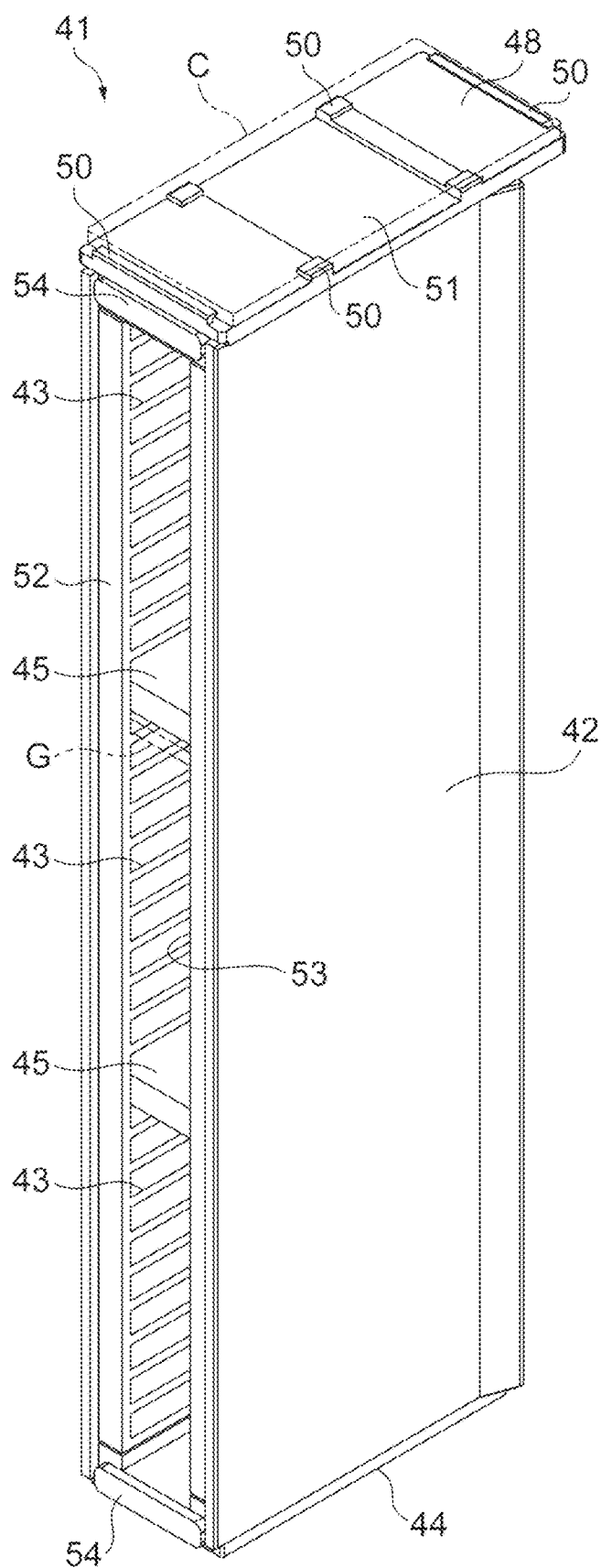
FIG. 4 is a perspective view illustrating the cassette illustrated in FIG. 3 from the back surface side.

The cassette mounting unit 21 is a unit in which a cassette 41 holding a plurality of slide glasses is detachably mounted. As illustrated in FIGS. 3 and 4, the cassette 41 includes a casing 42 made of a resin having a vertically long, substantially rectangular parallelepiped shape. Holding plates 43 and 43 that overhang toward the inner side of the casing 42 are provided on a pair of inner side walls of the casing 42, respectively. By placing the slide glass G on the holding plates 43 and 43, the slide glass G is held parallel with a bottom surface 44 of the casing 42.

In the cassette 41 of the embodiment, 30 stages of holding plates 43 and 43 are provided in a height direction of the cassette 41, and 30 slide glasses G can be held at one time. Further, in the embodiment, a partition plate 45 is disposed every 10 stages, and a holding interval of the slide glasses G in a disposition position of the partition plate 45 is wider than at other positions. Accordingly, the holding position of the slide glass G can be visually ascertained with ease.

One holding plate 43 and the other holding plate 43 are spaced from each other at a central portion of the casing 42. Further, the one holding plate 43 includes a projection portion 46 that projects to the front surface side of the casing 42, and a claw portion 47 that is provided at the tip of the projection portion 46. A width of the projection portion 46 narrows toward the front surface side of the casing 42, and the claw portion 47 is provided upwardly at the tip of the tapered projection portion 46. With such a configuration, in a state in which the slide glass G is mounted on the holding plates 43 and 43, a bottom surface of the slide glass G (particularly, the vicinity of a corner portion) is exposed from the holding plates 43 and 43 with a sufficient area. Therefore, the slide glass G can be easily removed from the holding plates 43 and 43 with a finger.

A placement unit 49 in which an identification card C is placed is provided in a top surface 48 of the cassette 41. An identification code including identification information for identifying the cassette 41 as a character string is imparted to one surface side of the identification card C on the top surface. The identification code may be directly printed on the identification card C, or a seal on which the identification code has been printed may be stuck thereon. The placement unit 49 has a plurality of claws 50 provided at an edge of the top surface 48. Side surfaces of the identification card C placed in the placement unit 49 are held by the claws 50. Further, a recessed portion 51 is provided with a constant width over its entirety in a width direction of the top surface 48 in a central portion of the top surface 48. Since a central portion of the identification card C is raised from the placement unit 49 due to the recessed portion 51, the identification card C can be easily removed from the placement unit 49 with a finger.

Further, as illustrated in FIG. 4, an opening 53 is provided at a central portion of a back surface 52 of the cassette 41. The opening 53 corresponds to a holding area of the slide glass G with respect to the holding plates 43 and 43 and extends with a constant width in the height direction of the cassette 41. Therefore, in an area in which the opening 53 is provided, it is possible to see the back surface side of the cassette 41 from the front surface side through the opening 53. Further, on the back surface 52 of the cassette 41, metal plates 54 that are used for mounting of the cassette 41 in the cassette mounting unit 21 are provided at positions below the opening 53 and above the opening 53, respectively. The metal plates 54 have, for example, a strip shape having a length substantially equal to a width of an internal space of the cassette 41 and is fixed to the casing 42 by a fastening means such as a screw.

Figure 5:
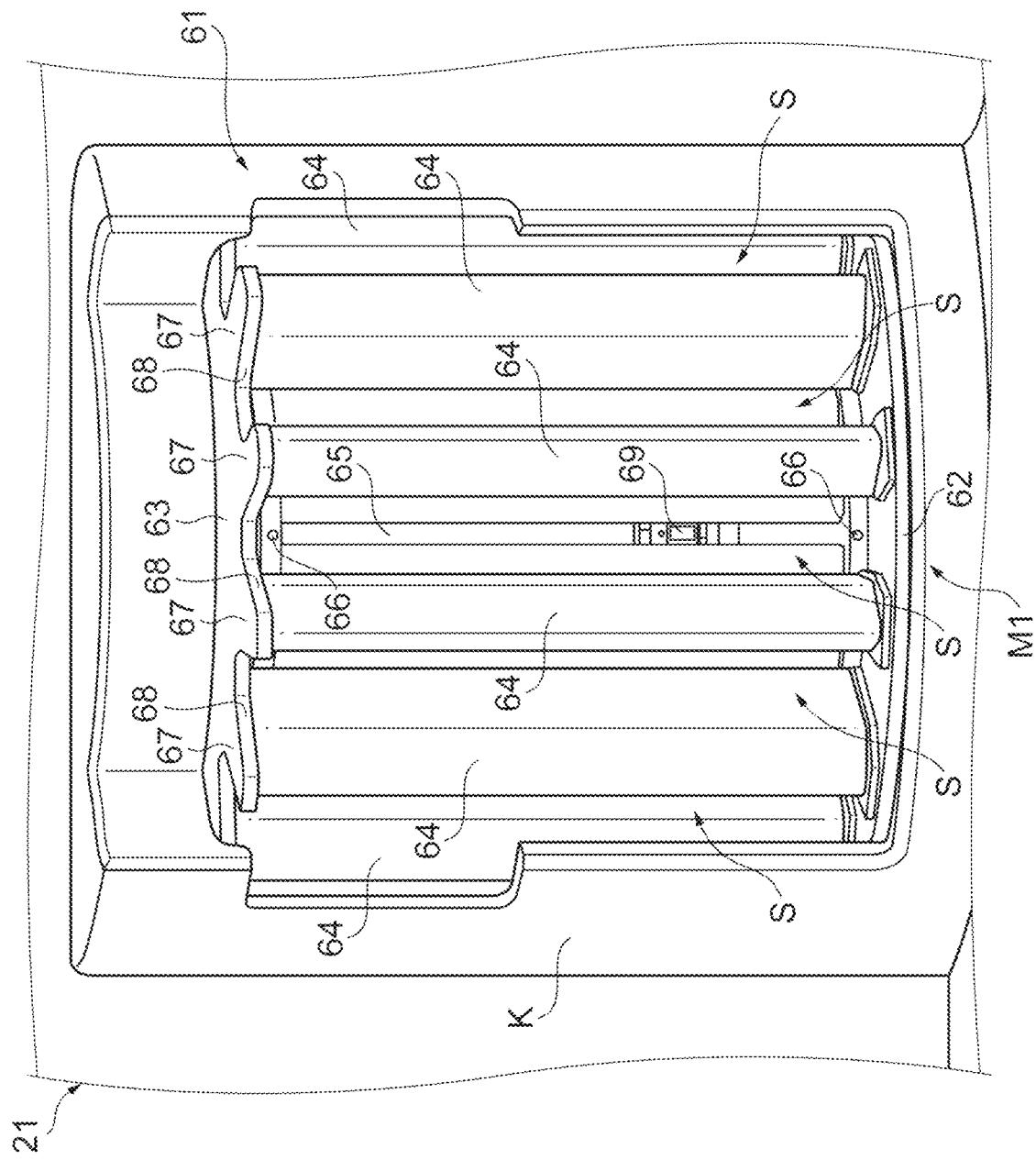
FIG. 5 is a front view illustrating an example of a cassette mounting unit.

FIG. 5 is a front view illustrating an example of the cassette mounting unit 21. As illustrated in FIG. 5, the cassette mounting unit 21 includes a rotation drum 61 in which a plurality of cassettes 41 can be mounted, in a frame K. The rotation drum 61 includes a bottom plate 62, a top plate 63, and a plurality of cassette holding plates 64 disposed between the bottom plate 62 and the top plate 63. A strut 65 is provided at a central portion of the rotation drum 61. The strut 65 passes through openings respectively provided in a central portion of the bottom plate 62 and a central portion of the top plate 63, and serves as a fixed shaft (a non-rotating shaft). The strut 65 may be either a cylinder or a square column.

The cassette holding plates 64 are radially disposed with a constant phase angle around a central axis of the rotation drum 61. A space between adjacent cassette holding plates 64 and 64 serves as a holding space S of the cassette 41 described above. In the embodiment, twelve holding spaces S are provided in a circumferential direction of the rotation drum 61. Since the cassette holding plates 64 are radially disposed, the holding space S narrows toward the back side from the outer circumferential side of the rotation drum 61. Further, end portions of adjacent cassette holding plates 64 and 64 are spaced at constant intervals on the back side of the holding space S. Accordingly, a peripheral surface or a side surface of the strut 65 on a back side of the holding space S can be seen from the front surface side of the rotation drum 61.

Magnets 66 are provided at positions on the back side of the holding spaces S on the bottom plate 62 and the top plate 63, respectively. By inserting the cassette 41 (see FIGS. 3 and 4) into the holding space S in a state in which the back surface side is directed to the back side, the upper and lower metal plates 54 on the back surface side of the cassette 41 are coupled to the upper and lower magnets 66 of the holding space S by a magnetic force. Thus, the cassette 41 is detachably held on the rotation drum 61.

An actuator that rotates the rotation drum 61 in one direction (for example, clockwise) around the central axis is provided at a portion under the bottom plate 62. In the rotation drum 61 of the embodiment, a mounting position M1 of the cassette 41 is set so that the cassette 41 is directed to the front surface side of the image acquisition device 11. In the example of FIG. 5, in the mounting position M1, three holding spaces S can be accessed from a window of the frame K, and three cassettes 41 can be mounted on the rotation drum 61 at one time. The cassettes 41 held in the holding space S are sequentially sent from the mounting position M1 to a detection position M2 in which various detections are performed and a removal position M3 in which the slide glass G in the cassette 41 is taken out and sent to the image acquisition unit 24, by rotation of the rotation drum 61 (see FIG. 6).

Further, the top plate 63 includes a plurality of holding pieces 67 that extend radially from the center side and hold upper ends of the cassette holding plates 64. A notch portion 68 corresponding to a planar shape of the holding space S is provided between the holding pieces 67 and 67. The top surface 48 (that is, the placement unit 49 of the identification card C) of the cassette 41 held in the holding space S can be seen through the top plate 63 by the notch portion 68.

Referring back to FIG. 2, the cassette mounting detection unit 31 is a unit that detects a mounting state of the cassette 41 on the rotation drum 61. The cassette mounting detection unit 31 includes, for example, a distance sensor 69 that detects a distance from the cassette 41 held in the holding space S to the strut 65, and determines whether or not the mounting state of the cassette 41 is good on the basis of a detection result of the distance sensor 69. The cassette mounting detection unit 31 may report a result of the determination of the mounting state of the cassette 41 using a reporting means, and output instruction information to the operation control unit 34 to prohibit rotation of the rotation drum 61 when there is an abnormality in the mounting state of the cassette 41.

The identification code reading unit 32 is a unit that reads the identification code imparted to the identification card C. The identification code reading unit 32 includes, for example, an identification code reader disposed above the rotation drum 61, and reads the identification code from the identification card C placed on the top surface of the cassette 41 sent to the detection position M2 by the rotation of the rotation drum 61. The identification code reading unit 32 outputs the identification information of the cassette 41 included in the read identification code to the image processing unit 25.

The slide glass detection unit 33 is a unit that detects at least one of the holding position and the holding state of the slide glass G in the cassette 41. For example, the slide glass detection unit 33 includes a photoelectric sensor 71 (to be described below) disposed outside the rotation drum 61, and detects the holding position and/or the holding state of the slide glass G in the cassette 41 sent to the detection position M2 by the rotation of the rotation drum 61. The slide glass detection unit 33 outputs holding information indicating the detected holding position and/or holding state to the slide glass removal unit 22. The slide glass detection unit 33 may perform reporting using a reporting means when there is an abnormality in the detected holding position and/or holding state. More details of the slide glass detection unit 33 will be described below.

The slide glass removal unit 22 is a unit that removes the slide glass G from the cassette 41 held by the rotation drum 61. The slide glass removal unit 22 includes a removal means such as a conveyance hand, and sequentially takes out the slide glasses G from the cassette 41 sent to the removal position M3 by the rotation of the rotation drum 61 and delivers the slide glasses G to the slide glass conveyance unit 23. Further, the slide glass removal unit 22 receives the slide glasses G for which the image acquisition of the image acquisition unit 24 has been completed from the slide glass conveyance unit 23 and causes the slide glasses G to return to original holding positions in the cassette 41.

Driving of the conveyance hand by the slide glass removal unit 22 is controlled on the basis of the holding information that is output from the slide glass detection unit 33. For example, the slide glass removal unit 22 may remove only the slide glasses G of which the holding position and/or the holding state has been detected as being normal using the conveyance hand, and skip the removal of the slide glasses G of which the holding position and/or the holding state has been detected as being abnormal.

The slide glass conveyance unit 23 is a unit that conveys the slide glass G received from the slide glass removal unit 22 toward the image acquisition unit 24. Further, the slide glass conveyance unit 23 conveys the slide glass G between a macro image acquisition position and a micro image acquisition position of the image acquisition unit 24. The slide glass conveyance unit 23 delivers the slide glasses G for which the image acquisition unit 24 has completed image acquisition, to the slide glass removal unit 22.

The image acquisition unit 24 is a unit that images a sample held on the slide glass G and acquires an image of the sample. The image acquisition unit 24 includes, for example, a macro image acquisition device and a micro image acquisition device. The macro image acquisition device acquires a macro image of the slide glass G conveyed to the macro image acquisition position by the slide glass conveyance unit 23 using an imaging device for macro image acquisition. The macro image acquisition device sets an acquisition range (a scan range) of the micro image, a focus measurement position, and the like on the basis of the acquired macro image.

The micro image acquisition device acquires a micro image of the slide glass G conveyed to the micro image acquisition position by the slide glass conveyance unit 23, using an imaging device for micro image acquisition. The micro image acquisition device creates a focus map of the sample on the basis of the scan range and the focus measurement position set by the macro image acquisition device, using an objective lens with a high magnification of, for example, 40×, 80×, or 100×. The micro image acquisition device controls a height of the objective lens with respect to the sample on the basis of the created focus map, and acquires a micro image in the scan range using the imaging device for micro image acquisition. The image acquisition unit 24 outputs data of a macro image acquired by the macro image acquisition device, data of a micro image acquired by the micro image acquisition device, and data such as a scan range and a focus map to the image processing unit 25.

A scanning scheme in the micro image acquisition may be a strobe scanning scheme using an area image sensor or may be a line scanning scheme using a line scan sensor. Further, the scanning scheme may be a stop-and-go scheme in which movement, stopping, and imaging of the slide glass are repeatedly performed in the scan range.

The image processing unit 25 is a unit that processes the image acquired by the image acquisition unit 24. The image processing unit 25 is configured of, for example, a computer system such as a Field-Programmable Gate Array (FPGA), an Applications Specific Integrated Circuit (ASIC), or a microcomputer. The image processing unit 25 combines the micro image data received from the image acquisition device 11 to generate a virtual slide image of the sample. The image processing unit 25 associates the generated virtual slide image with the identification information of the cassette 41 received from the identification code reading unit 32, and stores the virtual slide image in the data server 14 together with data such as the scan range and the focus map via the control computer 12.

Subsequently, the slide glass detection unit 33 described above will be described in more detail.

Figure 6:
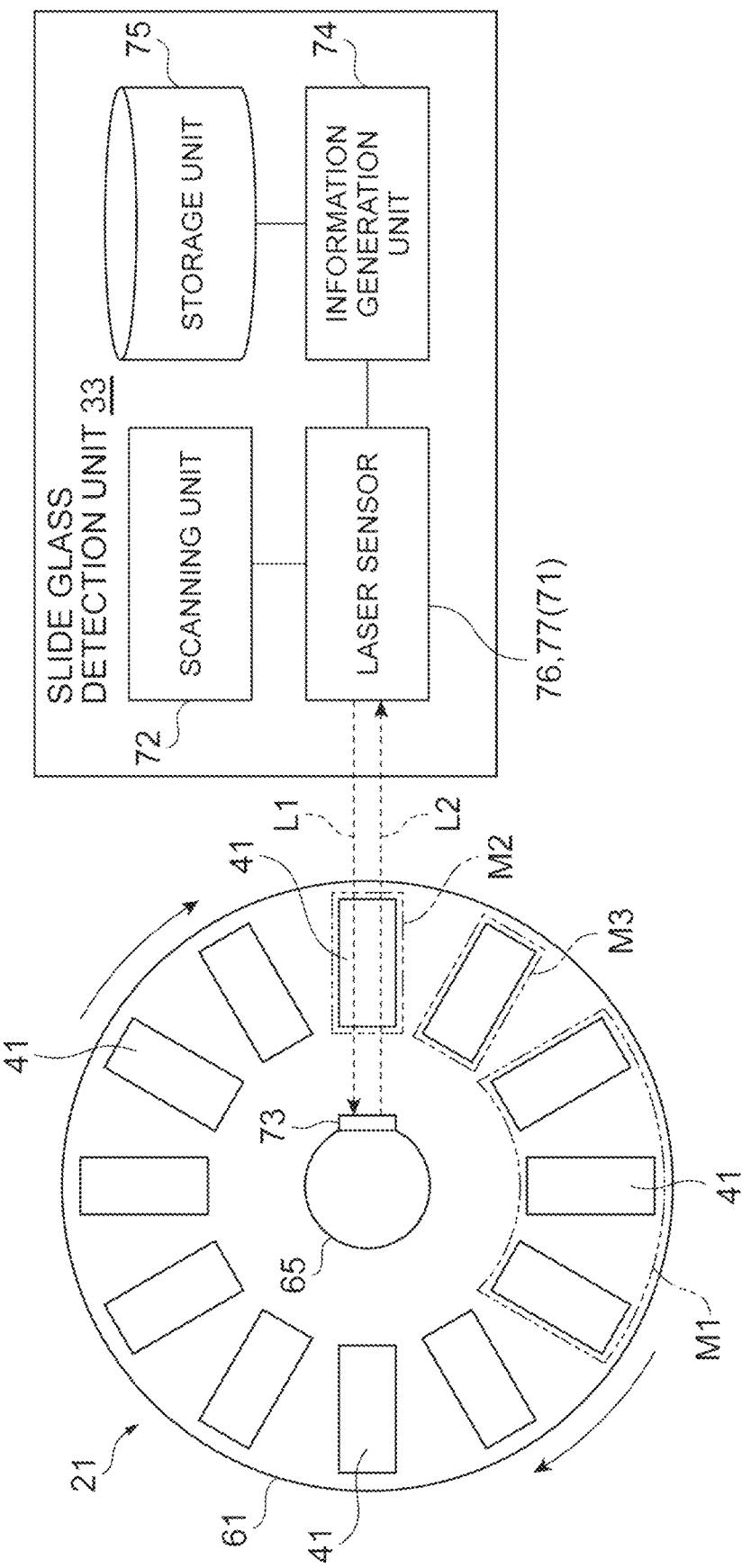
FIG. 6 is a block diagram illustrating an example of a slide glass detection unit.

FIG. 6 is a block diagram illustrating an example of the slide glass detection unit. As illustrated in FIG. 6, the slide glass detection unit 33 includes a photoelectric sensor 71, a scanning unit (a scanner) 72, a light reflection unit (a reflector) 73, an information generation unit 74, and a storage unit (a storage) 75.

The photoelectric sensor 71 includes a light source 76 and a light detection unit 77, and detects inspection light L1 emitted from the light source 76 using the light detection unit 77. The photoelectric sensor 71 is also referred to as a beam sensor, a photoelectric sensor, or a laser sensor. The light source 76 is a unit that emits the inspection light L1 toward the cassette 41 mounted in the cassette mounting unit 21. The inspection light L1 may be either coherent light or incoherent light. Therefore, as the light source 76, for example, a laser diode, a super luminescent diode, or a light emitting diode can be used. The light source 76 is disposed, for example, to face a central portion in a width direction of the cassette 41 located at the detection position M2.

Figure 7:
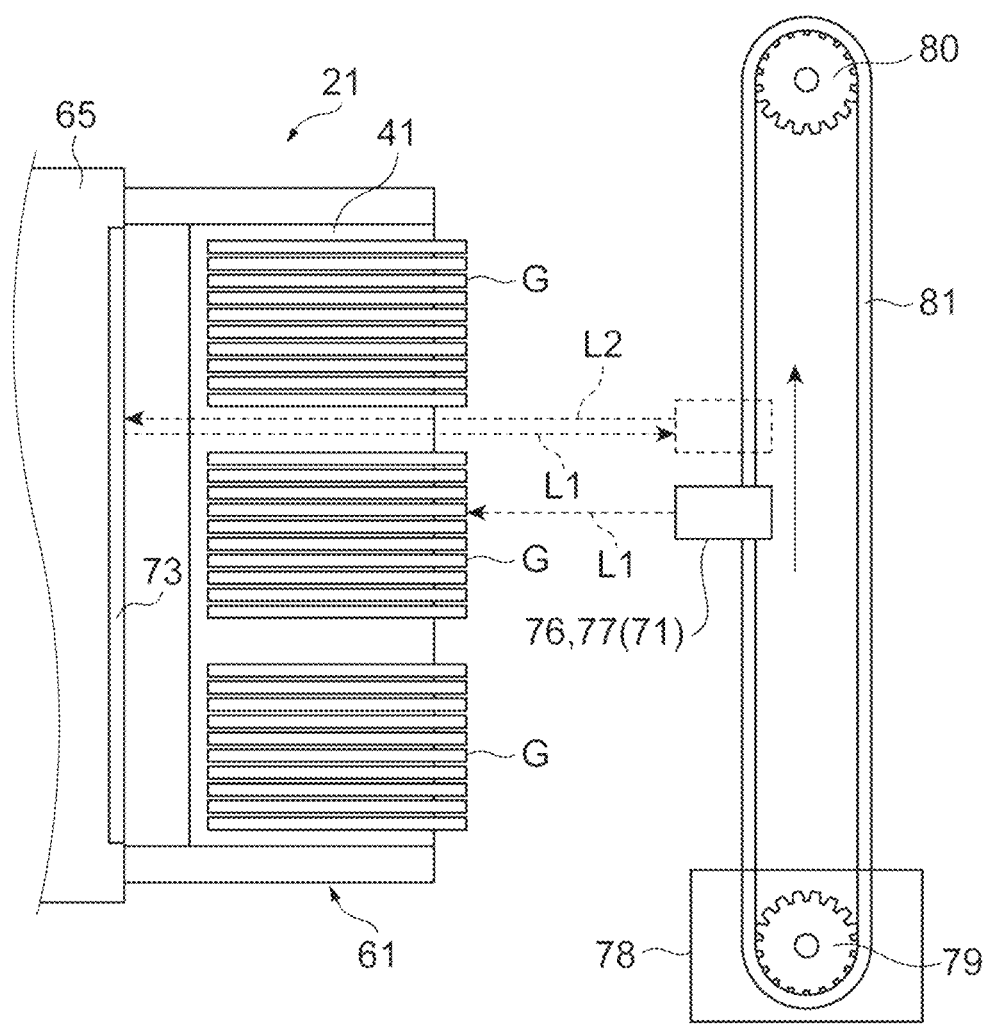
FIG. 7 is a schematic view illustrating a configuration of the slide glass detection unit.

The scanning unit 72 is a scanner that moves the photoelectric sensor 71, which includes the light source 76 and the light detection unit 77, in the height direction of the cassette 41, that is, an arrangement direction of the slide glass G in the cassette 41. That is, the inspection light L1 emitted from the photoelectric sensor 71 is scanned by the scanning unit 72 in the height direction of the cassette 41, that is, in an arrangement direction of the slide glass G in the cassette 41. For example, as illustrated in FIG. 7, the scanning unit 72 includes a circumferential rotation belt 81 wound around a driving shaft 79 and a driven shaft 80 of a motor 78. The photoelectric sensor 71 described above is fixed to the circumferential rotation belt 81, and linear scanning is performed with the inspection light L1 at a constant speed in the arrangement direction of the slide glasses G in the cassette 41 by driving of the circumferential rotation belt 81.

The light reflection unit 73 is a reflector that reflects the inspection light L1 on the back surface side of the cassette. More specifically, the light reflection unit 73 is configured of, for example, a retroreflector such as a corner reflector. For example, as illustrated in FIG. 7, the light reflection unit 73 is provided on the side surface of the strut 65 to face the light source 76 in the height direction of the cassette 41. Further, the light detection unit 77 is a detector that detects the reflected light of the inspection light L1 reflected by the light reflection unit 73. The light detection unit 77 is configured of, for example, a photodiode or a photomultiplier tube. The light detection unit 77 detects reflected light L2 including the inspection light L1 reflected by the light reflection unit 73, the cassette 41, and the slide glass G, and outputs a detection signal according to the detection result to the information generation unit 74.

With the above configuration, at a position in which the slide glass G is present, the inspection light L1 is scattered by the slide glass G on the front surface side of the cassette 41, and a part of the inspection light L1 is reflected. Therefore, intensity of the reflected light L2 detected by the light detection unit 77 is weak. On the other hand, at a position in which the slide glass G is not present, the inspection light L1 passes through the opening 53 (see FIG. 4) of the back surface 52 of the cassette 41 without being scattered by the slide glass G. Most of the inspection light L1 having passed through the opening 53 is reflected by the light reflection unit 73. The reflected light L2 passes through the inside of the cassette 41 from the opening 53 again, and is detected by the light detection unit 77. Therefore, the intensity of the reflected light L2 detected by the light detection unit 77 is higher than in the position in which the slide glass G is present.

The information generation unit 74 is a signal processing circuit that generates holding information on the holding position and/or the holding state of the slide glass G held by the cassette 41. The information generation unit 74 is physically configured of, for example, a computer system such as a microcomputer. When the information generation unit 74 receives the detection signal from the light detection unit 77, the information generation unit 74 first executes reading of reference information from the storage unit 75.

The reference information is generated on the basis of the detection signal (a reference signal) of the reflected light L2 in a state in which the cassette 41 having no slide glass G held therein is mounted in the cassette mounting unit 21. The reference information is, for example, a waveform of the reference signal. The information generation unit 74 corrects the detection signal from the light detection unit 77 on the basis of the reference information, and detects the holding position and/or the holding state of the slide glass G on the basis of the corrected detection signal. More specifically, the information generation unit 74 corrects the waveform of the detection signal, for example, by taking a difference or division between the waveform of the detection signal from the light detection unit 77 and the waveform of the reference signal. The information generation unit 74 detects the holding position and/or the holding state of the slide glass G on the basis of the corrected waveform of the detection signal. The information generation unit 74 generates holding information on the basis of a detection result of the holding position and/or the holding state of the slide glass G, and outputs the holding information to the slide glass removal unit 22.

Next, an operation of the image acquisition device 11 will be described.

Figure 8:
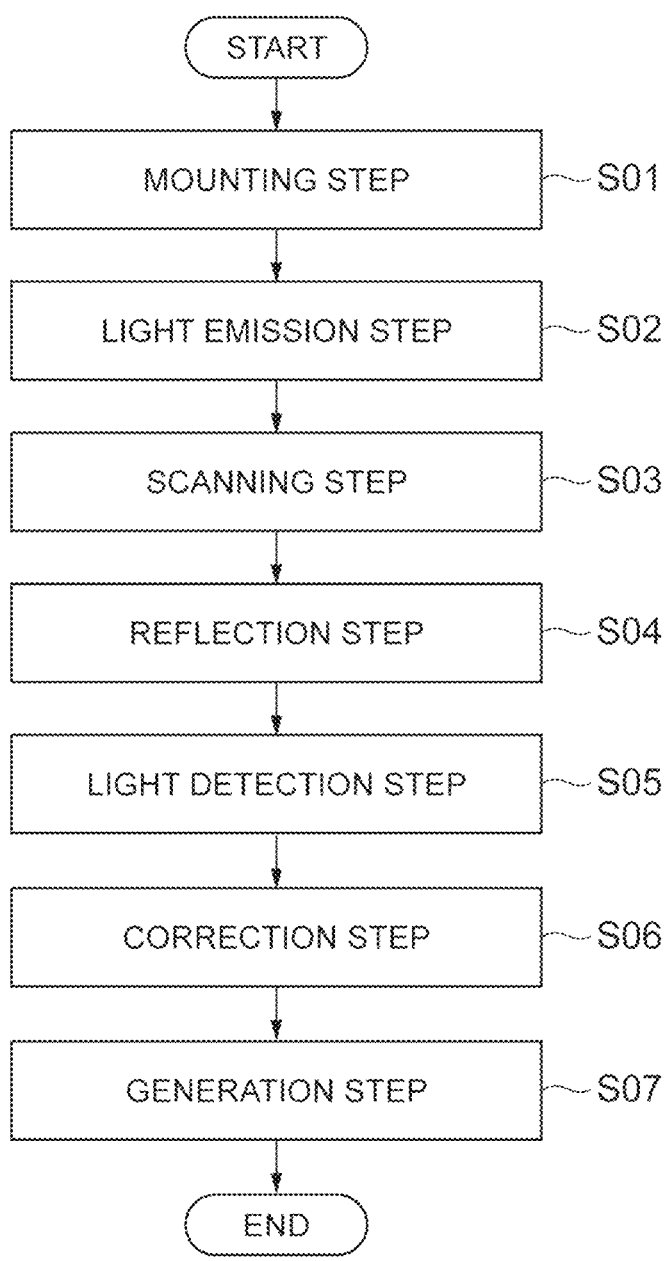
FIG. 8 is a flowchart illustrating an example of an operation of the image acquisition device.

FIG. 8 is a flowchart illustrating an example of the operation of the image acquisition device 11. As illustrated in FIG. 8, in the image acquisition device 11, a detection step of detecting the holding position and/or the holding state of the slide glass G in the cassette 41 prior to the acquisition of the virtual slide image of the sample is executed by the slide glass detection unit 33. In this detection step, first, the cassette 41 is mounted in the cassette mounting unit 21 (step S01: mounting step).

When the cassette 41 is sent to the detection position M2 by the rotation of the rotation drum 61 after the cassette 41 is mounted, the inspection light L1 is emitted from the light source 76 (step S02: light emission step). Further, the light source 76 is scanned by the scanning unit 72 in the height direction of the cassette 41 (the arrangement direction of the slide glass G in the cassette 41) in a state in which the inspection light L1 is emitted (step S03: scanning step). The inspection light L1 emitted from the light source 76 is being scanned in the height direction (the arrangement direction), and reflected by the light reflection unit 73, the cassette 41, or the slide glass G (step S04: reflection step). The reflected light L2 in step S04 is detected by the light detection unit 77 (step S05: light detection step).

After the reflected light L2 is detected, the reference information is read by the information generation unit 74, and the detection signal is corrected on the basis of the reference information (step S06: correction step). After the correction of the detection signal, analysis of the corrected detection signal is performed, the holding position and/or holding state of the slide glass G is detected on the basis of; for example, a waveform of the corrected detection signal, and the holding information is generated on the basis of the detected holding position and and/or holding information (step S07: generation step).

Hereinafter, an example in which holding positions and/or holding states of the slide glasses G are detected by the slide glass detection unit 33 will be described.

Figure 9:
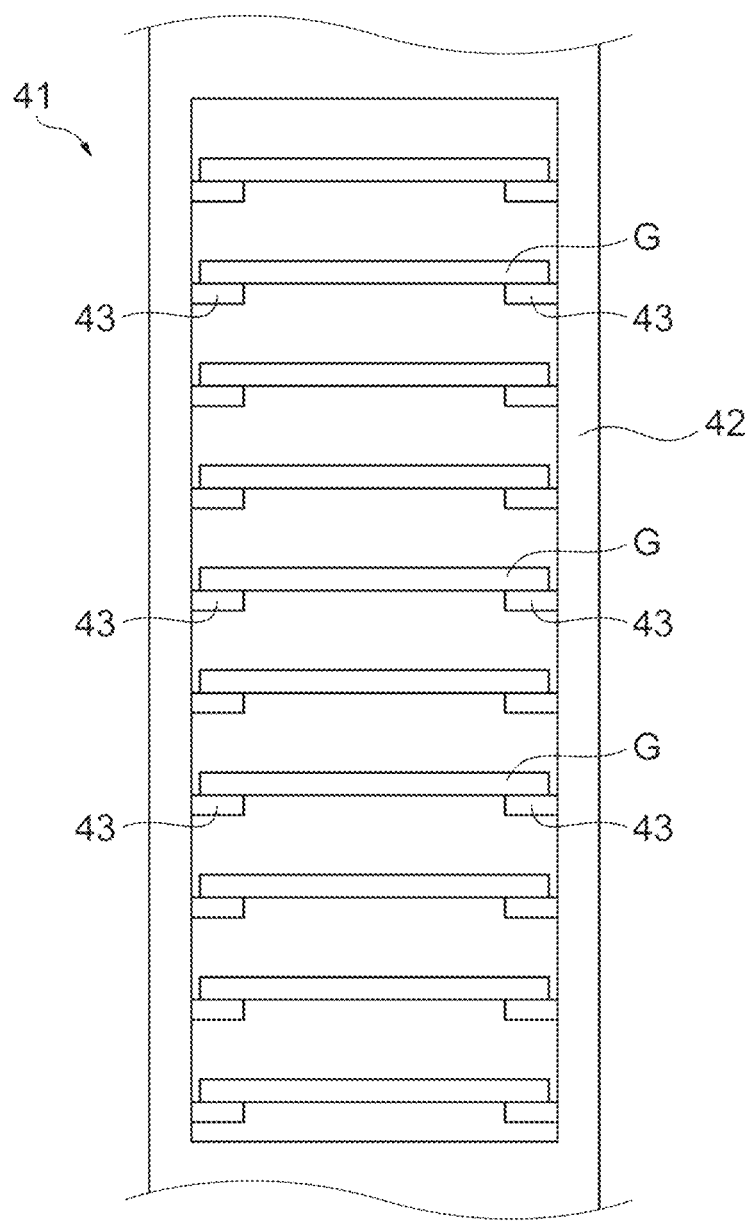
FIG. 9 is a diagram illustrating an example in which a holding position and a holding state of the slide glass in the cassette are normal.
Figure 10:
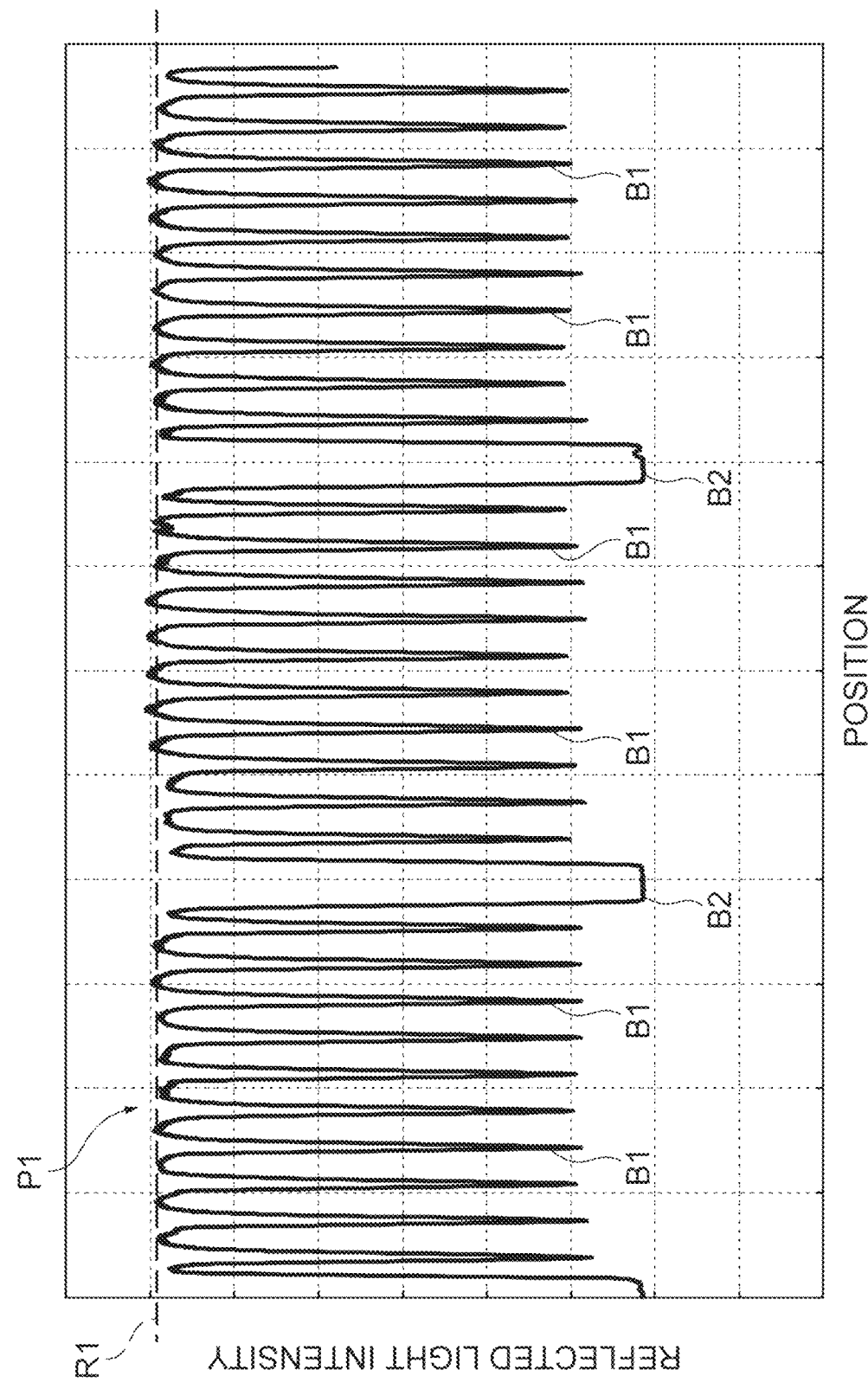
FIG. 10 is a diagram illustrating an example of a detection signal in the case of FIG. 9.

FIG. 9 is a diagram illustrating an example in which the holding position and the holding state of the slide glass in the cassette are normal. In the example of FIG. 9, the slide glass G is held in parallel to each of the holding plates 43 of each stage of the cassette 41. FIG. 10 is a diagram illustrating an example of the detection signal in this case. In FIG. 10, a vertical axis indicates intensity of reflected light, and a horizontal axis indicates a position (a scanning position of the inspection light L1). Here, scanning with the inspection light L1 is performed from the lower end side to the upper end side of the cassette 41. As described above, the inspection light L1 is scattered by the slide glass G at a position in which the slide glass G is present, and the reflected light L2 is hardly detected by the light detection unit 77. The inspection light L1 passes through the cassette 41 and is reflected by the light reflection unit 73 at the position in which the slide glass G is not present, and the reflected light L2 is detected with a sufficient amount of light by the light detection unit 77.

Therefore, in a waveform P1 of the detection signal, a baseline R1 of the reflected light intensity appears at the position in which the slide glass G is not present, and a bottom B1 appears regularly corresponding to the holding position of the slide glass as illustrated in FIG. 10, when the holding position and the holding state of the slide glass G are normal. It should be noted that a bottom B2 having a wide width appearing between the bottoms B1 and B1 corresponds to the partition plate 45 provided every 10 stages.

Figure 11:
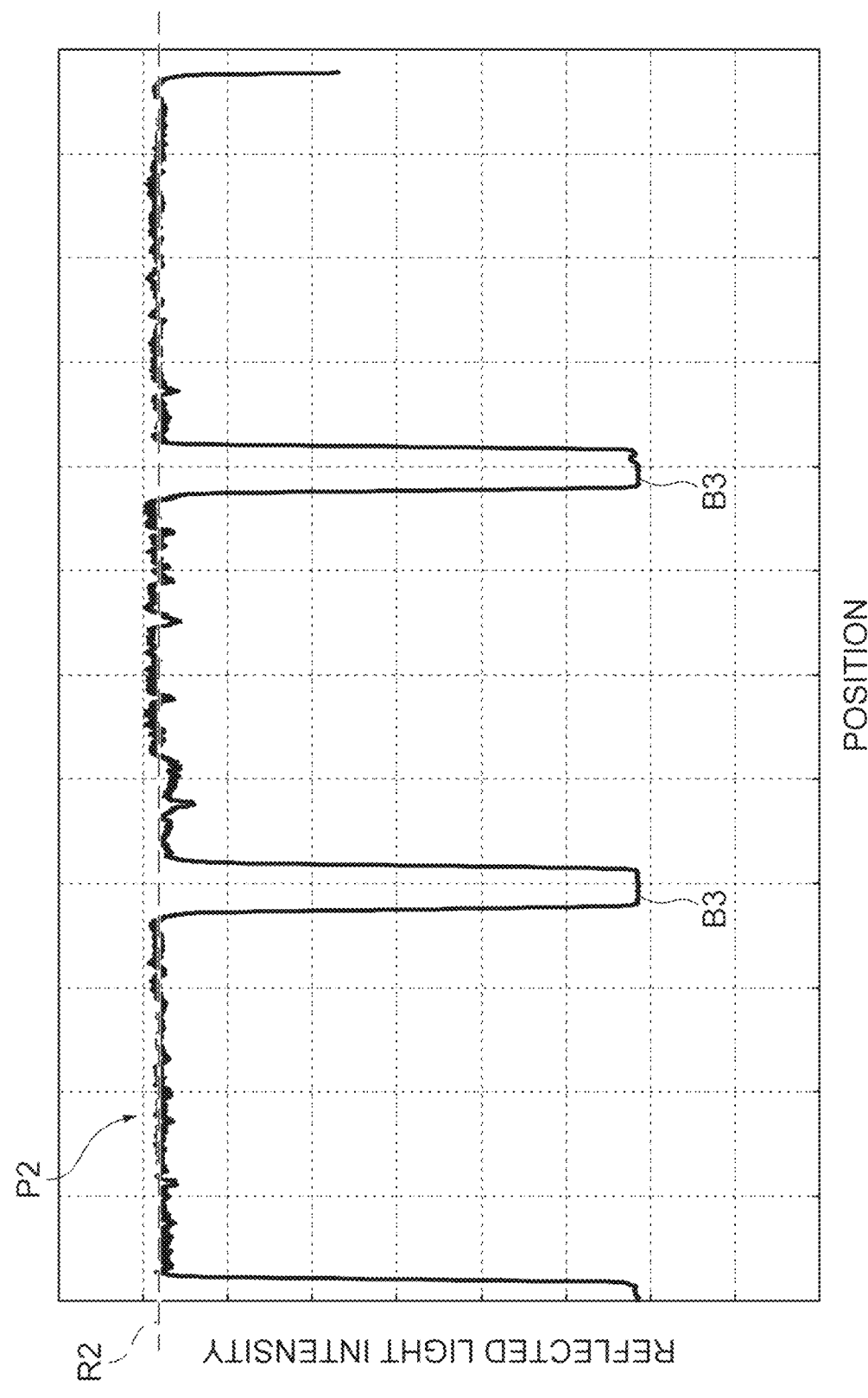
FIG. 11 is a diagram illustrating an example of a reference signal.

Further, FIG. 11 is a diagram illustrating an example of the reference information. In FIG. 11, a waveform of the reference signal is shown as the reference information. The reference information is a detection signal for the reflected light L2 in a state in which the cassette 41 having no slide glass G held therein is mounted in the cassette mounting unit 21. Therefore, in a waveform P2 of the reference information, a baseline R2 of reflected light intensity appears in positions other than the position corresponding to the partition plate 45, and a bottom B3 having a wide width appears at the position corresponding to the partition plate 45.

Figure 12:
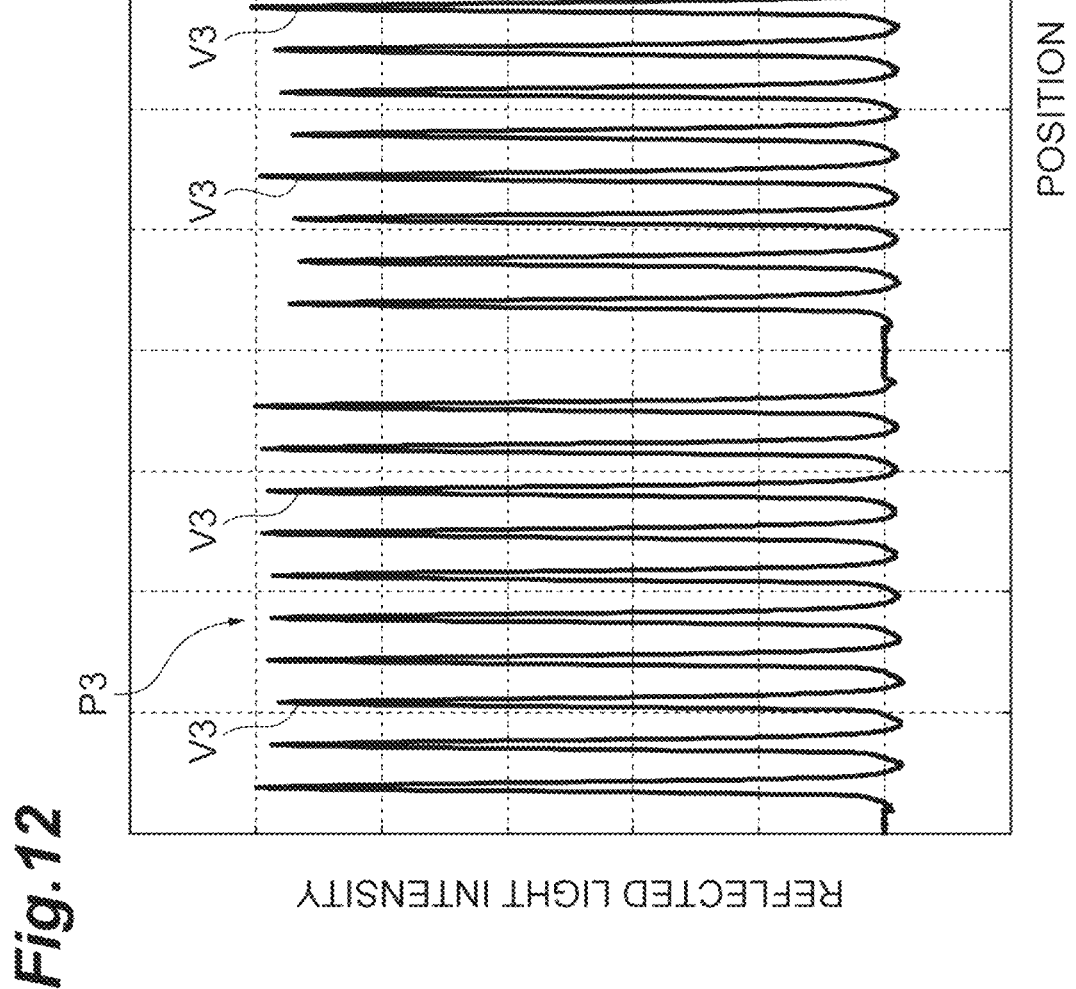
FIG. 12 is a diagram illustrating an example of a detection signal after correction.

FIG. 12 is a diagram illustrating an example of the detection signal after correction. A waveform P3 of the detection signal after correction is a difference between the waveform P1 of the detection signal illustrated in FIG. 10 and the waveform P2 of the reference information illustrated in FIG. 11. In the waveform P3 of the detection signal after correction, an intensity of the reflected light is reversed, and a peak V3 appears regularly corresponding to the holding position of the slide glass G A holding position and/or a holding state of the slide glass G can be detected by setting a threshold value of an appearance position of the peak V3 and a width (full width at half maximum or the like) of the peak V3 in advance.

Figure 13:
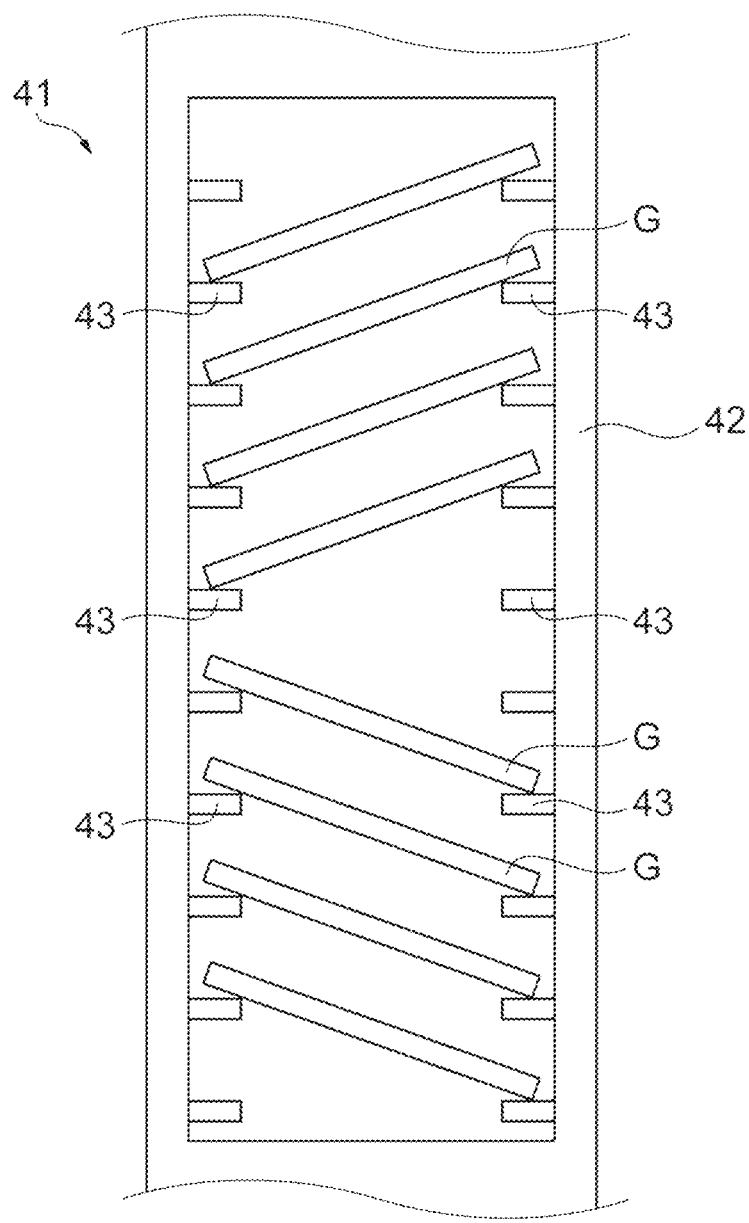
FIG. 13 is a diagram illustrating another example in which the holding position and the holding state of the slide glass in the cassette are abnormal.

FIG. 13 is a diagram illustrating an example in which the holding positions and the holding states of the slide glasses in the cassette are abnormal. In the example in FIG. 13, right and left edges of the slide glass G are held by the holding plates 43 and 43 in different stages, and the slide glass G is inclined in a width direction. In FIG. 13, the four slide glasses G on the upper side are up right, and the four slide glasses G on the lower side are up left.

Figure 14:
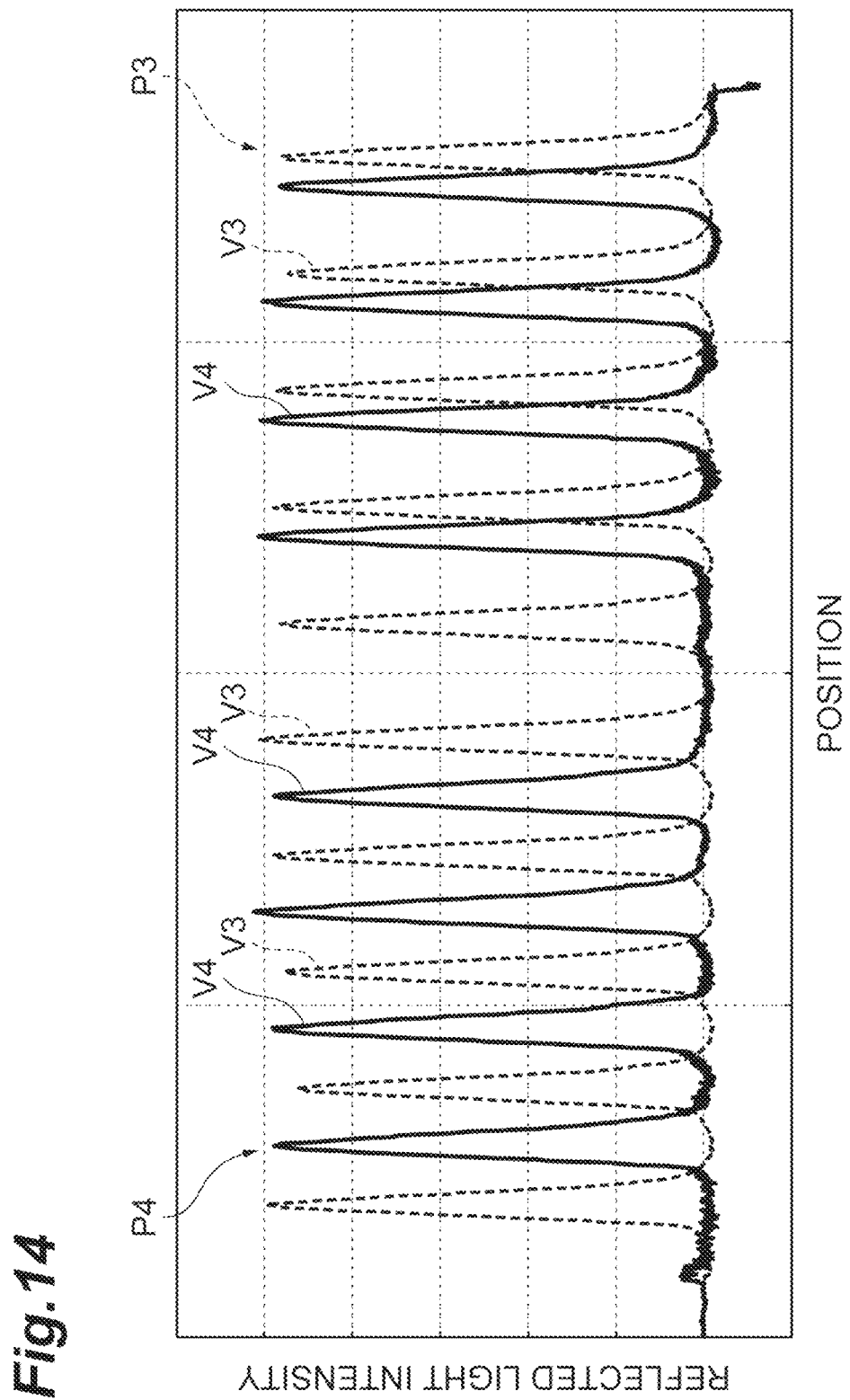
FIG. 14 is a diagram illustrating an example of the detection signal after correction in the case of FIG. 13.

FIG. 14 is a diagram illustrating an example of the detection signal after correction in the case of FIG. 13. As illustrated in FIG. 14, when the slide glass G is held in an inclined state, the position of the slide glass G on a scan line of the inspection light L1 fluctuates with respect to the arrangement direction as compared with a case in which the slide glass G is normally held. Therefore, in a waveform P4 of the detection signal after correction, a width of a peak V4 is not different from that of a peak V3 of a waveform P3 at normal time, but a position of the peak V3 greatly fluctuates with respect to a position of the peak V3 of the waveform P3 at normal time. Therefore, when the width of the peak V4 is the same as at normal time and the position of the peak V4 is greatly shifted with respect to that at normal time, it can be detected that the slide glasses G in a corresponding stage are inclined and held.

Figure 15:
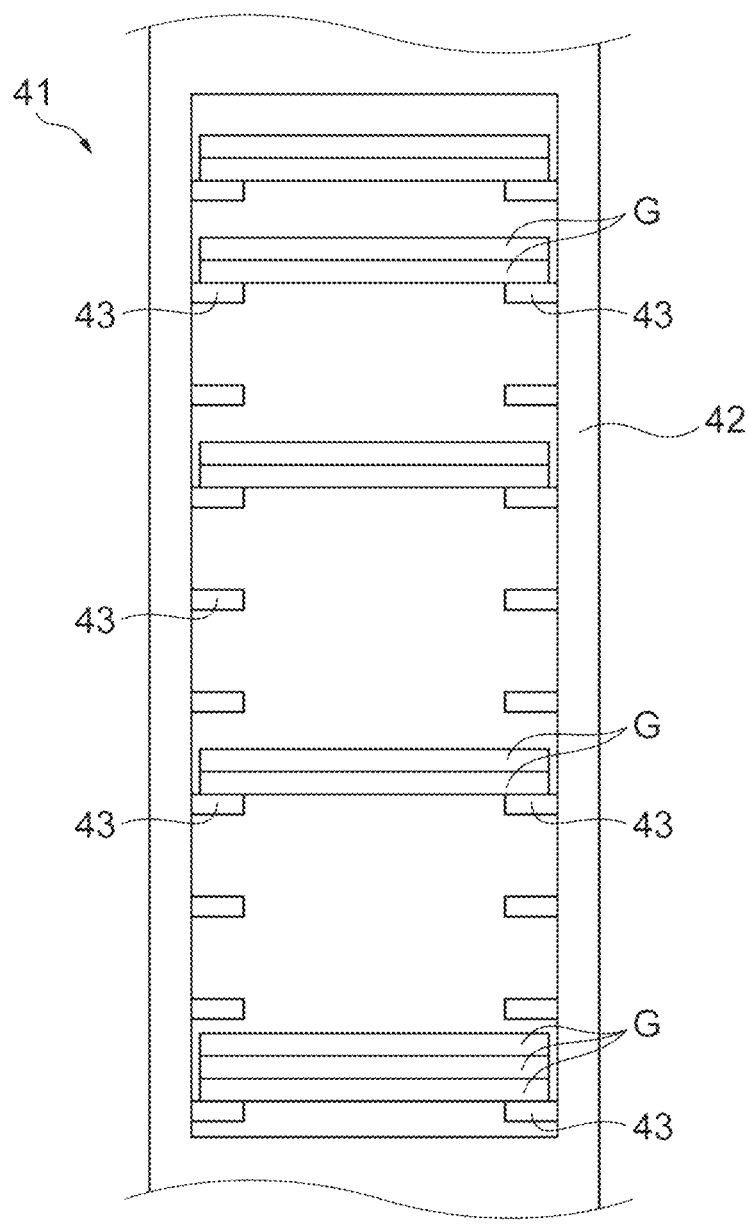
FIG. 15 is a diagram illustrating another example in which the holding position and the holding state of the slide glass in the cassette are abnormal.
Figure 16:
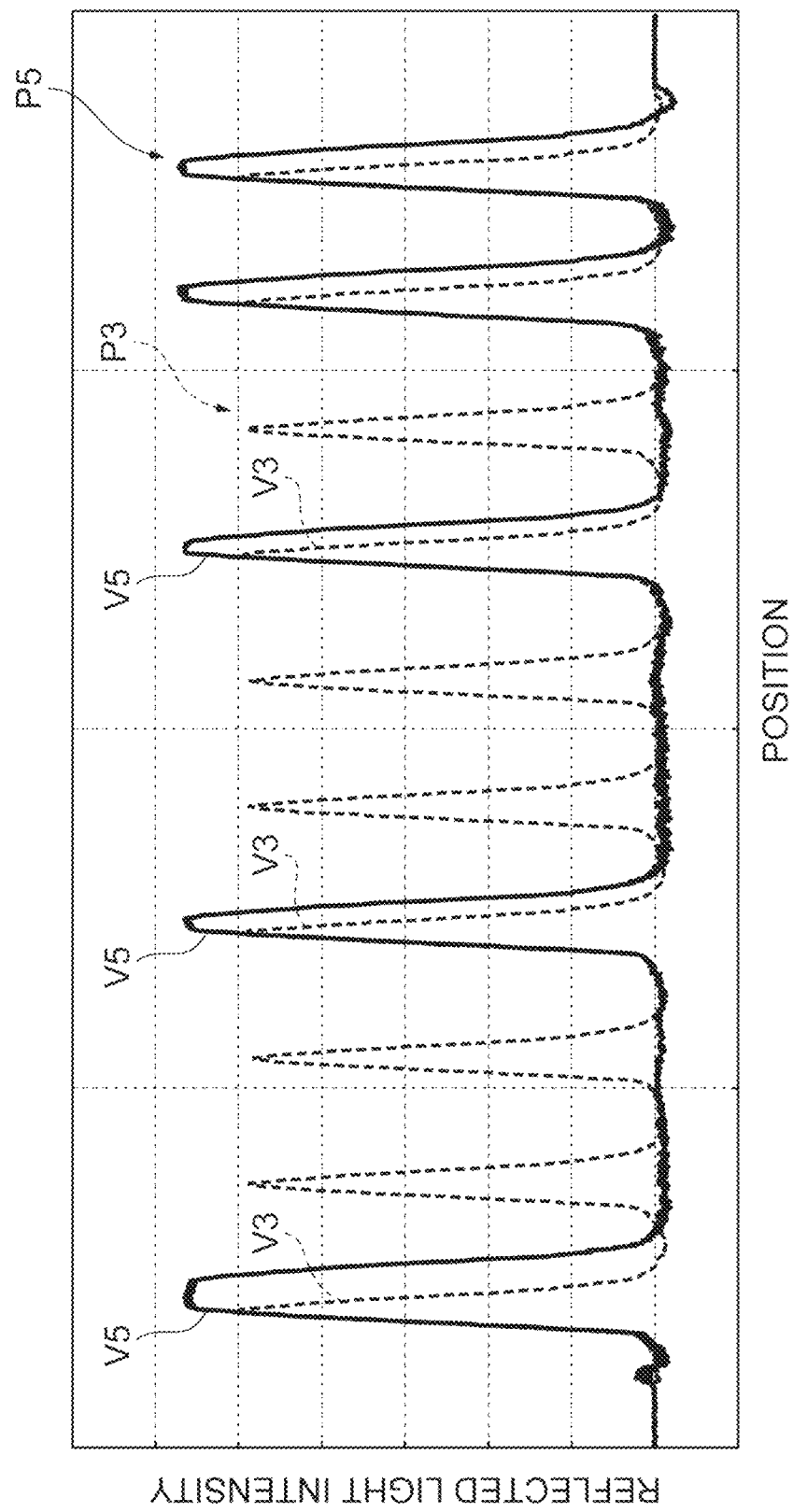
FIG. 16 is a diagram illustrating an example of the detection signal after correction in the case of FIG. 15.

Further, FIG. 15 is a diagram illustrating another example in which the holding position and the holding state of the slide glass in the cassette are abnormal. In the example illustrated in FIG. 15, a plurality of slide glasses G are held by the holding plates 43 and 43 in the same stage, and the slide glasses G are not held by the holding plates 43 and 43 in the other stages. FIG. 16 is a diagram illustrating an example of the detection signal after correction in the case of FIG. 15. As illustrated in FIG. 16, when the plurality of slide glasses G are held, in a waveform P5 of the detection signal after correction, a width of a peak V5 is larger than a peak V3 of a waveform P3 at a normal time, and a position of the peak V5 slightly fluctuates (to an extent that overlapping of the peaks V3 and V5 is maintained) with respect to a position of the peak V3 of the waveform P3 at the normal time.

Therefore, when the width of the peak V5 is larger than that at the normal time and the position of the peak V5 is slightly shifted with respect to that at the normal time, it can be detected that a plurality of slide glasses G in a corresponding stage are held. Further, when the slide glass G is not hold, the peak V5 does not appear in the position in which the peak V5 is to appear. Therefore, it can be detected that the slide glass G is not held in a corresponding stage, on the basis of the presence or absence of the peak V5.

As described above, in the image acquisition device 11, the cassette 41 holding the slide glasses G in a plurality of stages in a predetermined arrangement direction is scanned in the arrangement direction with the inspection light L1 from the light source 76. The reflected light L2 including the inspection light L1 reflected by the light reflection unit 73, the cassette 41, or the slide glass G is detected by the light detection unit 77. At a position in which the slide glass G is present, the intensity of the reflected light L2 detected by the light detection unit 77 becomes weak since the inspection light L1 is scattered by the slide glass G. On the other hand, at a position in which the slide glass G is not present, the intensity of the reflected light L2 detected by the light detection unit 77 becomes higher than in the position in which the slide glass G is present since the inspection light L1 is reflected by the light reflection unit 73 without being scattered by the slide glass G.

Therefore, the holding position and/or the holding state of the slide glass G in the cassette 41 appear as a detection signal from the light detection unit 77. For example, holding information on the holding position and/or the holding state of the slide glass G can be generated by analyzing a waveform pattern of the detection signal. By ascertaining the holding information in advance, it is possible to reduce useless conveyance work in the image acquisition device 11 and to shorten a time required for image acquisition in units of cassettes 41. Further, it is possible to prevent occurrence of failure of a conveyance hand or the like in the slide glass removal unit 22.

Further, in the image acquisition device 11, the information generation unit 74 holds, as the reference information, a detection signal for the reflected light L2 in a state in which the cassette 41 having no slide glass G held therein is mounted in the cassette mounting unit 21, and generates holding information on the basis of the detection signal corrected with the reference information. It is possible to enhance generation accuracy of the holding information by performing such correction on the detection signal.

Further, in the image acquisition device 11, the opening 53 through which the inspection light L1 and the reflected light L2 pass is provided on the back surface side of the cassette 41. Therefore, the reflected light L2 from the light reflection unit 73 can be detected with a sufficient amount of light through the opening 53, and generation accuracy of the holding information can be further enhanced. Further, in the image acquisition device 11, the light reflection unit 73 reflects the inspection light L1 that has passed through the opening 53 of the cassette 41 toward the light detection unit 77, and the light detection unit 77 detects the reflected light L2 that has passed through the opening 53 of the cassette 41. Accordingly, since an optical system required for generation of the holding information can be simplified, an increase in size of the image acquisition device 11 can be avoided.

Further, in the image acquisition device 11, the light reflection unit 73 is provided on the strut 65 of the cassette mounting unit 21. Therefore, the light reflection unit 73 on the cassette mounting unit 21 side can be used commonly for a different cassette 41 sent to the detection position M2 by the rotation of the rotation drum 61. Since it is not necessary to provide the light reflection unit 73 for each cassette 41, it is possible to achieve reduction of manufacturing costs of the cassette 41.

Further, in the image acquisition device 11, the light reflection unit 73 is including a retroreflector. Accordingly, directivity of reflection of the inspection light L1 in the light reflection unit 73 can be secured, and the reflected light L2 from the light reflection unit 73 can be detected with a more sufficient amount of light. Therefore, it is possible to further enhance the generation accuracy of the holding information.

Figure 17:
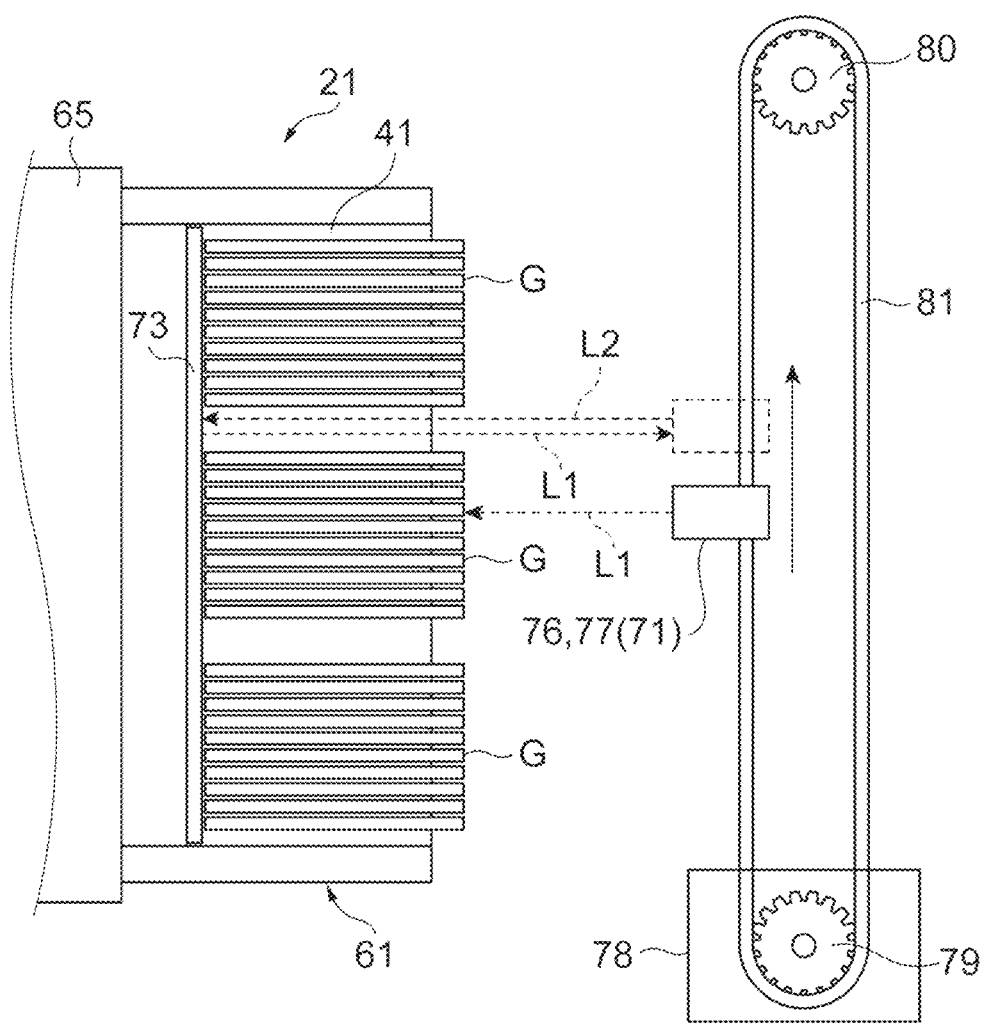
FIG. 17 is a diagram illustrating a modification example of the slide glass detection unit.

The present disclosure is not limited to the above embodiment. For example, for the light reflection unit 73, a retroreflector may not be necessarily used and, for example, a configuration in which another reflection material such as a metal plate, a light reflection plate, or a light reflection sheet is attached to the strut 65 may be adopted. Further, the light reflection unit 73 may be disposed on the cassette 41 side instead of the cassette mounting unit 21 side. In this case, for example, the light reflection unit 73 may be provided on the back surface (here, an inner surface of a wall portion on the back surface side) of the cassette 41, as illustrated in FIG. 17, instead of the opening 53 being provided on the back surface side of the cassette 41. In this case, since it is not necessary to provide the cassette 41 with a mechanism such as the opening 53 for transmitting the inspection light L1, it is possible to avoid complication of a configuration of the cassette 41. Further, a distance between the light source 76 and the light detection unit 77, and the light reflection unit 73 can be shortened, and the reflected light L2 can be detected with a sufficient amount of light. Therefore, it is possible to further enhance the generation accuracy of the holding information.

Further, although the photoelectric sensor 71 is fixed to the circumferential rotation belt 81 and is separate from the slide glass removal unit 22 in the above embodiment, the photoelectric sensor 71 is attached to the conveyance hand of the slide glass removal unit 22. In this case, since the conveyance hand of the slide glass removal unit 22 also functions as the scanning unit 72, a configuration of the image acquisition device 11 can be simplified.

The holding information generated by the information generation unit 74 may be information on both the holding position and the holding state of the slide glass G, and may be information on one of the holding position and the holding state of the slide glass G. Further, the reflected light L2 may be inspection light L1 reflected by any one of the light reflection unit 73, the cassette 41, and the slide glass G, or may be inspection light L1 reflected by a combination of these.

REFERENCE SIGNS LIST

11: Image acquisition device
21: Cassette mounting unit
41: Cassette
53: Opening
72: Scanning unit
73: Light reflection unit
74: Information generation unit
76: Light source
77: Light detection unit
G: Slide glass
L1: Inspection light
L2: Reflected light.

The invention claimed is:
1. A device comprising:
a cassette mounting unit configured to be detachably mounted with a cassette holding slide glasses in a plurality of stages in a predetermined arrangement direction;
a light source configured to emit inspection light toward the cassette mounted in the cassette mounting unit;
a scanner configured to perform scanning with the inspection light in the arrangement direction;
a light reflector configured to be disposed on the back surface of the cassette and to reflect the inspection light emitted from the light source;
a light detector configured to detect reflected light including the inspection light reflected by at least one of the light reflector, the cassette, and at least one of the slide glasses, and output a detection signal; and
an information generator configured to generate holding information on at least one of a holding position and a holding state of the at least one slide glass held in the cassette on the basis of the detection signal.

2. The device according to claim 1, wherein the information generator holds reference information generated on the basis of a detection signal for the reflected light in a state in which a cassette having no slide glass held therein is mounted in the cassette mounting unit, and generates the holding information on the basis of the detection signal corrected with the reference information.

3. The device according to claim 1, wherein the cassette includes an opening through which the inspection light and the reflected light pass.

4. The device according to claim 3, wherein:
the light reflector reflects the inspection light having passed through the opening toward the light detector, and
the light detector detects the reflected light that has passed through the opening.

5. The device according to claim 1, wherein the light reflector includes a retroreflector.

6. A method comprising:
emitting inspection light from a light source toward a cassette, the cassette holding slide glasses in a plurality of stages in a predetermined arrangement direction;
reflecting the inspection light emitted from the light source using a light reflector disposed on the back surface of the cassette while scanning the cassette with the inspection light in the arrangement direction;
detecting reflected light including the inspection light reflected by at least one of the light reflector, the cassette, and at least one of the slide glasses using a light detector, and outputting a detection signal; and
generating holding information on at least one of a holding position and a holding state of the at least one slide glass held in the cassette on the basis of the detection signal.

* * * * *